US012666051B2

(12) United States Patent (10) Patent No.: US 12,666,051 B2
DeWeese et al. (45) Date of Patent: Jun. 23, 2026

(54) VIDEO STREAMING

(71) Applicant: Google LLC, Mountain View, CA (US)

(72) Inventors: Thomas Edward DeWeese,
Boxborough, MA (US); **Jeremy
Christopher Dorfman**, Burlington, MA
(US)

(73) Assignee: Google LLC, Mountain View, CA (US)

( * ) Notice: Subject to any disclaimer, the term of this
patent is extended or adjusted under 35
U.S.C. 154(b) by 0 days.

(21) Appl. No.: 18/495,405

(22) Filed: Oct. 26, 2023

(65) Prior Publication Data

US 2025/0142089 A1 May 1, 2025

(51) Int. Cl.
*H04N 7/12* (2006.01)
*H04N 19/124* (2014.01)
*H04N 19/172* (2014.01)
*H04N 21/2187* (2011.01)

(52) U.S. Cl.
CPC ......... *H04N 19/172* (2014.11); *H04N 19/124*
(2014.11); *H04N 21/2187* (2013.01)

(58) Field of Classification Search
CPC .............. H04N 19/172; H04N 19/124; H04N
21/2187; H04N 21/234345; H04N
21/2365; H04N 21/8455; H04N 21/8456;
H04N 21/2343
USPC .................................................... 375/240.12
See application file for complete search history.

(56) References Cited

U.S. PATENT DOCUMENTS

| 5,623,308 A | 4/1997 | Civanlar et al. |
| 9,870,759 B2 * | 1/2018 | Oh ....................... G09G 3/3208 |
| 10,425,652 B2 | 9/2019 | Fuente et al. |
| 10,715,843 B2 | 7/2020 | Van Brandenburg et al. |

(Continued)

FOREIGN PATENT DOCUMENTS

| JP | 2002-027393 | 1/2002 |
| JP | 2019-033456 | 2/2019 |

(Continued)

OTHER PUBLICATIONS

Grange "A VP9 Bitstream Overview draft-grange-vp9-bitstream-00" Network Working Group, Feb. 18, 2013, 13 pages.

(Continued)

*Primary Examiner* — Gims S Philippe
(74) *Attorney, Agent, or Firm* — Fish & Richardson P.C.

(57) ABSTRACT

Methods, systems, and apparatus, including computer programs encoded on computer storage media, for compressed-domain compositing of video streams. A server obtains compressed video streams, each compressed video stream including multiple frames, each frame including a video content region that is a portion of the frame, encoded using a segment identifier for pixels included in the video content region, and encoded using a set of static symbol frequencies. The server receives, from a user device, a request for video stream content, and composites a first and a second compressed video stream to obtain a compressed-domain composite video stream including a first video content region of the first compressed video stream and a second video content region of the second compressed video stream, and provides, to the user device, a packet including a set of frames of the compressed-domain composite video stream decodable by a single decoder.

20 Claims, 12 Drawing Sheets

(56) References Cited

U.S. PATENT DOCUMENTS

| | | | |
|---|---|---|---|
| 11,025,892 B1 * | 6/2021 | Aman | A63F 13/843 |
| 11,496,738 B1 * | 11/2022 | Waggoner | H04N 19/124 |
| 2001/0048753 A1 * | 12/2001 | Lee | G06T 7/215 |
| | | | 382/103 |
| 2005/0152448 A1 * | 7/2005 | Crinon | H04N 19/70 |
| | | | 348/700 |
| 2011/0268352 A1 * | 11/2011 | Tomi | H04N 19/90 |
| | | | 382/162 |
| 2012/0093214 A1 | 4/2012 | Urbach | |
| 2014/0184669 A1 | 7/2014 | Oh et al. | |
| 2016/0227291 A1 | 8/2016 | Shaw et al. | |
| 2022/0329883 A1 * | 10/2022 | Stokking | H04N 21/2353 |

FOREIGN PATENT DOCUMENTS

| | | |
|---|---|---|
| JP | 2022-066370 | 4/2022 |
| WO | WO 2022050166 | 3/2022 |

OTHER PUBLICATIONS

Grange et al., "VP9 Bitstream & Decoding Process Specification" Version 0.6, Mar. 31, 2016, 171 pages.

International Search Report and Written Opinion in International Appln. No. PCT/US2024/052375, mailed on Dec. 18, 2024, 15 pages.

Ramugedia.com [online], "On motion_vectors_over_pic_boundaries—Video Compression," available on or before Mar. 23, 2023, via Internet Archive: Wayback Machine URL <https://web.archive.org/web/20230323044719/https://www.ramugedia.com/on-motion-vectors-over-pic-boundaries>, retrieved on Apr. 25, 2024, URL<https://www.ramugedia.com/on-motion-vectors-over-pic-boundaries>, 2 pages.

Theverge.com [online], "Twitch's new ads are way less disruptive," Aug. 2, 2021, retrieved on Apr. 25, 2024, retrieved from URL <https://www.theverge.com/2021/8/2/22606297/twitch-stream-display-ads-disruptive-banner-screen>, 6 pages.

Notice of Allowance in Japanese Appln. No. 2025-519844, mailed on Mar. 31, 2026, 5 pages (with English translation).

* cited by examiner

*1100*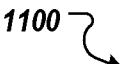

Obtain, by a local area server, compressed video streams, each compressed video stream including multiple frames, each frame including a video content region including a portion of the frame, each frame encoded with a first segmentation identifier for pixels included in the video content region and a second segmentation identifier for pixels not included in the video content region, and the multiple frames encoded using a set of static symbol frequencies

*1102*

Receive, by the local area server and from a user device, a request for video stream content

*1104*

Generate, by the local area server and in response to the request from the user device, the compressed-domain composite video stream from a first compressed stream and a second compressed stream of the compressed video streams, each frame of the compressed-domain composite video stream including a first video content region of the first compressed stream and a second video content region of the second compressed stream, the first video content region and the second video content region occupy non-overlapping portions of the frame

*1106*

Provide, to the user device, a packet including a set of frames of the compressed-domain composite video stream decodable by a single decoder

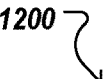
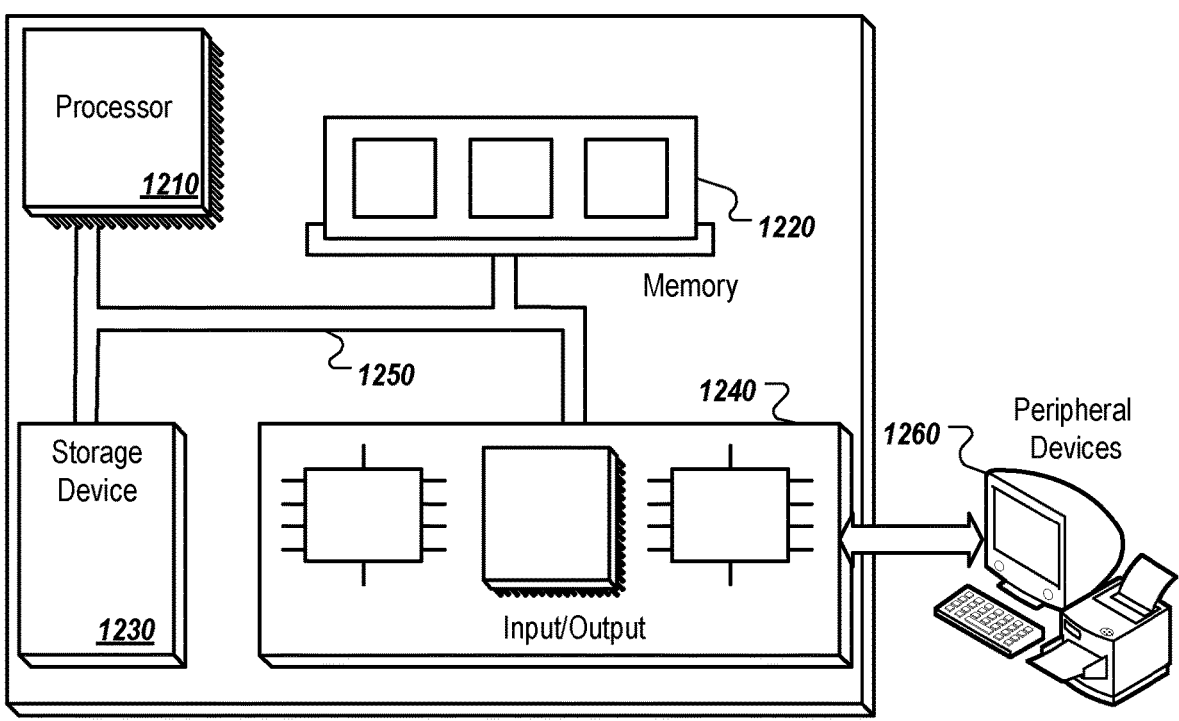
FIG. 12

VIDEO STREAMING

TECHNICAL FIELD

This specification relates to streaming video content.

BACKGROUND

Picture-in-picture (PiP) streaming is a multi-video viewing mode that allows users to view two or more video streams presented in the same window of the user device. For example, PiP can be used to present two or more different video streams having different content in the same viewing window so that the user can experience multiple streams simultaneously. At times, a user device may only include a single decoder such that it can only decode one video stream at a time for presentation at the user device.

SUMMARY

The subject matter of this specification is generally related to compressed-domain composition of a video stream.

More particularly, the subject matter of this specification is related to using compressed-domain compositing techniques to provide users with a fully personalized composite video stream including two or more video streams. The composited video stream can include at least two distinct streams that are composited in the compressed-domain at an edge server and provided to the end-user device, where the composite video stream is decodable by the end-user device using a single decoder. The composite stream can be a PiP or mosaic video stream including a primary video stream, e.g., third-party content video, and a secondary video stream, e.g., a livestream video content, which are served as a 50/50 split screen to the end-user device.

In general, one innovative aspect of the subject matter described in this specification can be embodied in methods that include the actions of obtaining, by a local area server, compressed video streams, each compressed video stream including a plurality of frames, each frame including a video content region that is a portion (e.g., at most 50%) of the frame. Each frame of the compressed video stream is encoded using a segment identifier for pixels included in the video content region, and the frames of the compressed video stream are encoded using a set of static symbol frequencies. The local area server receives, from a user device, a request for video stream content, and composites, in response to the request from the user device, a first compressed video stream and a second compressed video stream of the compressed video streams to obtain a compressed-domain composite video stream. Each frame of the compressed-domain composite video stream includes a first video content region of the first compressed video stream and a second video content region of the second compressed video stream. Each frame of the compressed-domain composite video stream includes a respective first segment identifier for pixels corresponding to the first video content region and a second segment identifier for pixels corresponding to the second video content region. The first video content region and the second video content region occupy non-overlapping portions of the frame. The local area server provides, to the user device, a packet including a set of frames of the compressed-domain composite video stream decodable by a single decoder.

Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. In some implementations, obtaining the compressed video streams includes: receiving, by a server, video streams, and generating each of the compressed video streams by rendering, for each frame of the multiple frames of the video stream, a new frame including a video content region including the portion of the frame and corresponding to content of the frame, defining, for the video content region, the segment identifier for pixels included in the video content region, and encoding the frame using a set of static symbol frequencies.

In some implementations, the rendering further includes rendering a region not included in the video content region as null content.

In some implementations, generating of the compressed video streams includes generating primary video streams including context-responsive video content, and generating at least one secondary video stream including livestream content, where the first compressed video stream is a primary video stream, and the second compressed video stream is a secondary video stream. The generating of the primary video streams can include pre-conditioning and storing context-responsive videos in a database for inclusion in the compressed-domain composite video stream, wherein a proper subset of the context-responsive video content is pre-cached at the local area server.

In some implementations, generating the compressed-domain composite video stream includes selecting, by the local area server and in response to a user-based selection criteria for the user device, a primary content video from the database of primary video stream for inclusion in the compressed-domain composite video stream. In response to a different user request, the local area server selects a different primary content video for inclusion in the compressed-domain composite video stream.

In some implementations, generating of the plurality of compressed video streams includes generating video streams including at least one of context-responsive video content and livestream content, where the first compressed video stream and the second compressed video stream are generated from the video streams.

In some implementations, encoding the frame using a set of static symbol frequencies includes encoding, for each symbol probability in the frame with a default frequency value.

In some implementations, defining, for the video content region, the segment identifier further includes assigning, to the segment identifier for pixels included in the video content region, a first quantization level.

In some implementations, the rendering further includes rendering, along an edge of the video content region and within the video content region of the compressed video stream, a null region comprising a width, the null region of the video content region being located next to a replacement region configured to be replaced by another compressed video stream in a composite video stream.

In some implementations, generating the compressed-domain composite video stream from a first compressed stream and a second compressed stream includes constructing an uncompressed header of each frame of the compressed-domain composite video stream based on the segment identifiers for each of the first compressed stream and the second compressed stream.

In some implementations, the frame includes tiles and where the video content region includes one or more contiguous tiles of a tile-based composite of the frame, where the pixels included in the video content region include the one or more contiguous tiles. The one or more contiguous tiles include the video content region is half of the tiles of the tile-based composite of the frame.

In some implementations, the methods further include obtaining, by the local area server, a second set of compressed video streams, each of the second set of compressed video stream including multiple frames. The local area server receives, from the user device, a second request for video stream content, and in response to the second request, provides, to the user device, a second packet including a set of frames for one of the second set of compressed video streams.

The subject matter described in this specification can be implemented in particular embodiments so as to realize one or more of the following advantages: An end-device can receive, decode, and view the bitstream-level composite stream as a single stream, even though the composite stream can be from two completely unrelated video streams. As a result, the end device does not experience any additional lag or increased computational requirement in order to view a composite stream including two distinct streams. The solutions described herein include back-end pre-conditioning but are lightweight from compute perspective in the real-time processing at the cache edge server and user device. The solutions described can have increased network bandwidth efficiency for serving multiple customized composite streams to different user devices, because the server only delivers the livestream plus N primary content streams (e.g., which can be pre-cached at the cache edge server).

Additionally, the features described in this specification allow for composite streams where the end user device can receive a fully-customized composite video stream including two or more video streams (e.g., a livestream and a third-party content stream), without substantial additional computational requirements at the end user device or at the edge server during the real-time provision of the livestream. In other words, the techniques described in this specification can result in substantially improved cacheability of the video streams at the cache edge server, where the cache edge server only has to store N+M video streams rather than N×M video streams.

As described herein, the compressed-domain composite processing of the videos generates a single composite stream in the compressed domain from the two or more input compressed streams on a per-user basis by the cache edge server and without requiring the edge server or the user device to perform arithmetic decoding and/or encoding of the compressed streams (e.g., to perform a concatenation of the video metadata and video inputs), which could otherwise be cost prohibitive and computationally burdensome in order to provide a per-user custom stream. The decoder of the user device effectively "sees" a single video, such that no additional processing requirement is required of the decoder to decode additional frames (e.g., the no show frames, alt-ref frames, etc.) By putting the bulk of the processing at the pre-conditioning step before providing the compressed videos to the cache edge server, a reduced processing requirement is met by the cache edge server and the end user device.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 11 is a flowchart of an example process for compressed-domain composite video streaming.

FIG. 12 is a block diagram of an example computer.

Like reference numbers and designations in the various drawings indicate like elements.

DETAILED DESCRIPTION

As used herein, the term "compressed-domain composite video stream," and "compressed-domain composite video processing" refers to bitstream-level composition of two or more encoded (i.e., compressed) video streams to form an output composite video stream incorporating and presenting all or a portion of the input video streams. In other words, having a picture-in-picture or mosaic of two or more different video streams presented in the frames of the composite video stream. The generating of composite video stream is performed in the compressed-domain, i.e., without decoding the composing videos to generate each frame of the composite video and then reencoding the frames of the composite video. Instead, as described in further detail below, the frames of the compressed-domain composite videos are generated from two or more compressed videos without needing to decode/re-encode the composing videos.

As used herein, the term "pre-conditioning" refers to receiving the output of a general-purpose video encoder (e.g., a hardware encoder) and adapting the output to enable the lightweight composition of content as previously described (e.g., by copying of the appropriate video metadata into a suitably constructed output frame). Several examples of codecs to perform the encoding/compression and decoding/decompression of video content are provided herein, but for clarity, the VP9 codec will be used as the main example for the processes described.

Figure 1:
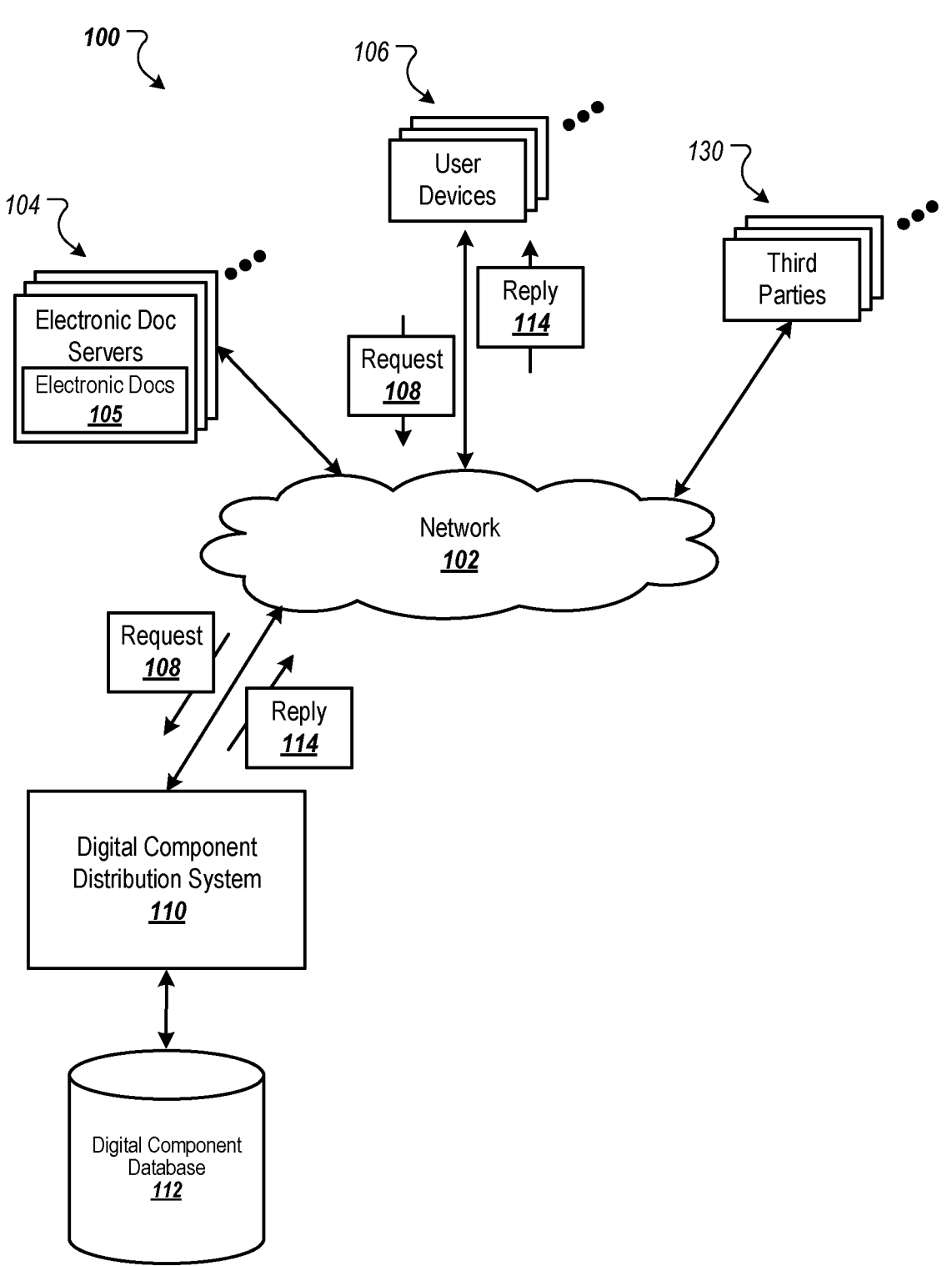
FIG. 1 is a block diagram of an example environment for compressed-domain composite video streaming.

FIG. 1 is a block diagram of an example environment 100 for compressed-domain composite video streaming. The example environment 100 includes a network 102, such as a local area network (LAN), a wide area network (WAN), the Internet, or a combination thereof. The network 102 connects electronic document servers 104 ("Electronic Doc Servers"), user devices 106, and a digital component distribution system 110 (also referred to as DCDS 110). The example environment 100 may include many different electronic document servers 104 and user devices 106.

A user device 106 is an electronic device that is capable of requesting and receiving resources (e.g., electronic documents) over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

One or more third parties 130 include content providers, product designers, product manufacturers, and other parties involved in the design, development, marketing, or distribution of videos, products, and/or services.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

The request 108 can include data specifying the electronic document (e.g., video content) and characteristics of locations at which digital content can be presented. For example, data specifying a reference to an electronic document (e.g., composite video stream) in which the digital content will be presented, available locations (e.g., digital content regions within the frames of the composite video) of the electronic documents that are available to present digital content, sizes of the available locations, and/or positions of the available locations within a presentation of the electronic document can be provided to the DCDS 110. Similarly, data specifying keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information indicating a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Data specifying characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. For example, the DCDS 110 selects a digital content item from the digital component database 112, e.g., one of a repository of pre-conditioned videos, that are available for generating a composite video stream with at least one other pre-conditioned video.

Figure 2:
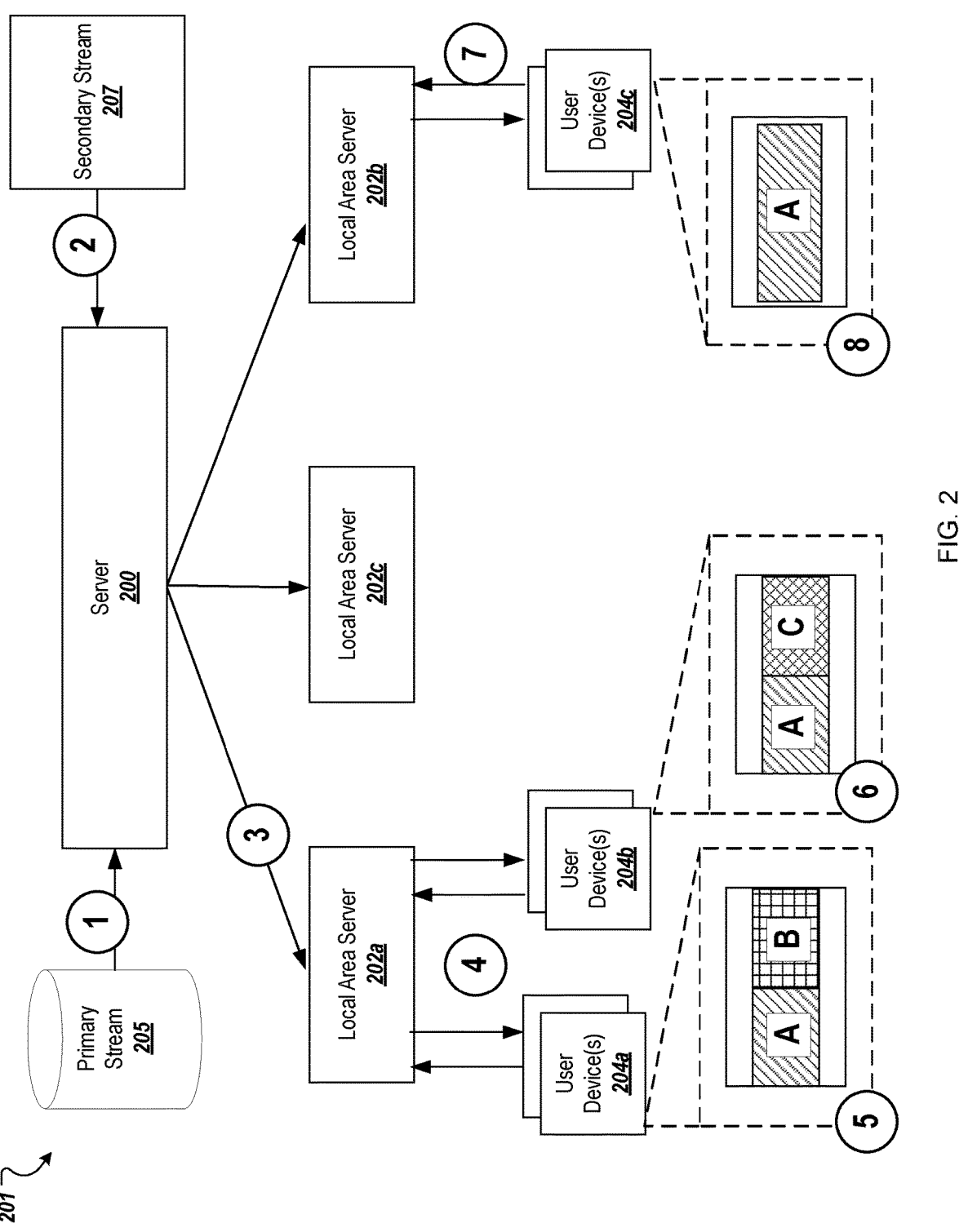
FIG. 2 is a block diagram of an example environment for compressed-domain composite video streaming.

In some implementations, the DCDS 110 is implemented in a distributed computing system (or environment) that includes, for example, a server, e.g., server 200 of FIG. 2, and a set of multiple computing devices, e.g., local area servers 202 of FIG. 2, that are interconnected and identify and distribute digital content in response to requests 108. For example, as described in further detail with reference to FIG. 2, cache edge servers can receive requests to distribute digital content and generate the composite video stream including the electronic document(s) to provide to the end user device. The set of multiple computing devices operate together to identify a set of digital content that is eligible to be presented with the electronic document as a composite video stream from among a corpus of millions or more of available digital content, e.g., pre-conditioned video content that can be used to generate compressed-domain composite video streams. The millions or more of available digital content can be indexed, for example, in a digital component database 112. Each digital content index entry can reference the corresponding digital content and/or include distribution parameters (e.g., selection criteria) that condition the distribution of the corresponding digital content.

In some implementations, digital components from digital component database 112 can include content provided by third parties 130. For example, the DCDS 110 can present video content, stored in the digital component database 112.

As described in further detail below, the digital components (e.g., videos) stored in the digital component database 112 can be pre-conditioned and stored in the database 112 in anticipation of being included into a composite video stream for presentation at a user device. Additionally, the digital components can be real-time (e.g., livestream video) which can be similarly pre-conditioned by the DCDS 110 in order to include the livestream video in a composite video stream for presentation at the user device. As used herein, the term "primary stream" generally refers to pre-conditioned context-responsive content for one or more users that is stored in the digital component database 112 for later incorporation by the DCDS 110 into customized composite video streams. As used herein, the term "secondary stream" refers to pre-conditioned livestream content that can be incorporated by the DCDS 110 into the customized composite video streams. Although described in this specification as a composite video stream including a primary stream and a secondary stream, two or more video streams can be used to produce a composite video stream. For example, a mosaic composite video stream can include three or more video streams, where each video stream can be a primary stream-type or secondary stream-type video content.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

As described above, the DCDS 110 can be implemented in a distributed computing system (or environment) that includes, for example, a server, e.g., a server 200, and a set of multiple computing local area servers 202 (e.g., cache edge devices) that are interconnected and identify and distribute digital content in response to requests 108.

FIG. 2 is a block diagram of an example environment 201 for compressed-domain composite video streaming. Server 200 can generate, process, and/or store video content. Video content can be pre-processed by the server 200 to generate an encoded (e.g., compressed) video content. For example, server 200 can encode context-responsive video content and store the encoded video content in a repository, e.g., digital component database 112, for later incorporation into customized composite video streams. In another example, server 200 can encode livestream video content in preparation for publishing the livestream video content to user devices.

Although described here as the actions performed by server 200, in some implementations, some or all of the encoding of the video content (e.g., the context-responsive video content and/or livestream video content) can be pre-conditioned (e.g., encoded) by one or more third parties. For example, a third-party content publisher (e.g., third parties 130) can pre-condition video content generated by the third party and provide the pre-conditioned video content to the server 200, e.g., over network 102.

The server 200 pre-conditions (i.e., pre-processes) the video content by encoding the video content using a VP9 codec, the details of which are described below. For simplicity, the encoding of the video content will be described with reference to the VP9 codec, however, other codecs may be used, for example, using H.264, H.265, AV1, or another codec that is configured to provide features sufficient to enable block replacement (e.g., tile-replacement) as described below.

At (1) the server 200 can receive, process, and store the primary video content 205 (e.g., third-party digital content) which can be accessible for future use in generating customized composite video content to the user. As described above, a primary video stream can include customized (e.g., selected to be contextually responsive to one or more user attributes) content for the end-user device and which may be unique to each end-user device receiving a composite (e.g., PiP) video stream from the DCDS 110. For example, the primary video stream can be selected based on contextual information including one or more attributes, e.g., user demographics, geography, viewing history, or other user-based preferences or information. The server 200 can pre-generate and pre-condition a repository of primary content stream videos, where the repository can include different content selectable for inclusion in a composite stream at a later point in time based in part on certain conditions (e.g., a receiving user's preferences, contextual information obtained from or associated with the receiving user's device, etc.).

At (2) the server can receive and process secondary video content 207, e.g., a livestream (e.g., real-time broadcast) video content which can be accessible for use in generating customized composite video content. The server 200 can publish at least two versions of the secondary content, including the (A) secondary stream only, and (B) a pre-processed version of the secondary stream that is combinable with primary stream(s) to generate a composite stream.

In some implementations, the server may pre-cache a repository of the primary stream digital content at the local area servers, e.g., local area server 202a, 202b, 202c, e.g., selected based on a set of user devices serviced by the local area server, a geographical location of the local area server, etc. For example, the server 200 may periodically pre-cache a set of primary stream digital content at the local area servers 202a-c to maintain an updated repository of pre-conditioned video content at the local area server that can be combinable, by the local area servers 202a-c, to produce the composite video stream for presentation at the user device 204. In some implementations, a different set of primary stream digital content can be cached at respective local area servers based in part, for example, on geographic location of the local area server and the user devices serviced by the local area server.

At (4) the local area server 202a receives a request for content from a user device, e.g., user device 204a. The request for content can include a request to view the secondary stream, i.e., the livestream video content (A). The local area server 202a can identify the possibility of providing the secondary stream in a composite stream, e.g., as a PiP in a primary stream including third party content. The selection process is described with reference to FIG. 1, but generally can be selected based on user information for the user device.

In some implementations, an auction can be performed (e.g., on an auction server) for third-party content from the repository of pre-conditioned primary stream videos and a winning, customized pre-conditioned primary stream from the repository of third-party content can be returned to the edge server.

The local area server 202a performs compressed-domain compositing of the selected primary and secondary streams to produce a composite video. The local area server 202a can provide the composite stream to the end-user device including a primary stream (B) and secondary stream (A). At (5), the end user device receives and decodes the composite stream to present, on the display of the user device, a composite stream including the livestream (A) and third-party content (B) in the viewport of the user device.

The local area server 202a can generate and provide two or more different composite streams to respective end-user devices. For example, at (6) the local area server 202a provides a different composite stream including the same secondary content (A) with a different primary content (C) to a second user device 204b.

In some implementations, the local area server can perform this process sequentially to request and serve multiple (e.g., two or more) primary content streams sequentially in the encoded composite stream including the secondary stream. In some implementations, the local area server 202a can provide multiple (e.g., two or more) sequential secondary streams with the encoded composite stream.

In some implementations, the request (e.g., request 108) can include an opt-out for viewing the primary content (e.g., the non-livestream video content) such that the local area server, e.g., local area server 202b, provides at (7) only the secondary stream (A) (e.g., the livestream) for presentation to the user device(s) 204c. In some implementations, the request (e.g., request 108) can include a change between a request to view a composite stream and a request to view a livestream, described in further detail with reference to FIG. 4 below.

As depicted in FIG. 2, the local area server 202a performs compressed-domain compositing of the selected primary and secondary streams to produce a composite video in response to a request from a user device for content. As such, the local area server 202a can produce a different customized composite video on a per-device (or per-cluster of devices) basis, with minimal decoding effect downstream at the user device. In effect, each user device 204 receives, from the local area server 202a, a single customized composite video decodable by a single decoder.

At times, different end-user devices can all receive, from the local area server 202a, the composite stream. At times, different end-user devices can each receive either (i) the composite stream or (ii) the secondary stream only, from the local area server 202a. At times, at least one end-user device receives a composite stream having a different primary stream than at least one other end-user device.

Each frame can be divided into subportions, e.g., including one or more tiles (e.g., in VP9 codec) or including one or more slices (e.g., in H.264 codec), where each of the subportions is encoded independently of each other of the subportions. Within the scope of the VP9 codec, a tile-replacement process can be used to generate, e.g., at the local edge server, the composite encoded stream using compressed-domain compositing techniques. Within the VP9 framework, each tile is independently arithmetically encoded and decoded, where tiles can be encoded and/or decoded in parallel. Different numbers of tiles can be used depending in part on constraints of the VP9 specification, for example, a 1080p stream includes 4 tiles, a 4 k stream includes 8 tiles, a 480p stream includes 2 tiles, etc.

Figure 3A:
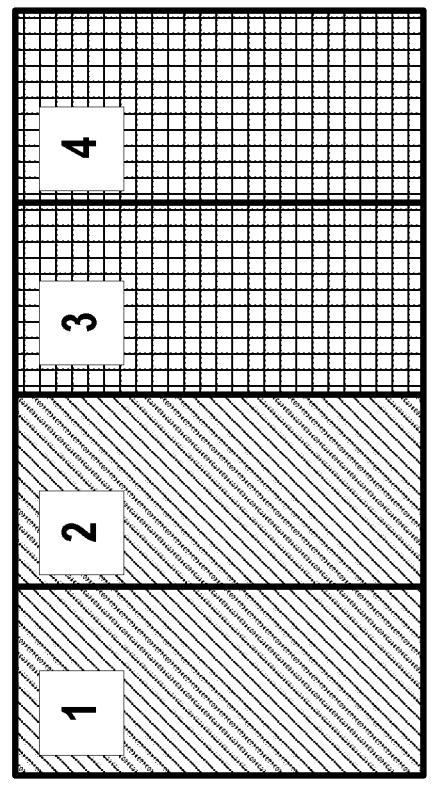
FIGS. 3A-3B depict schematic examples of tile-based compositing.
Figure 3B:
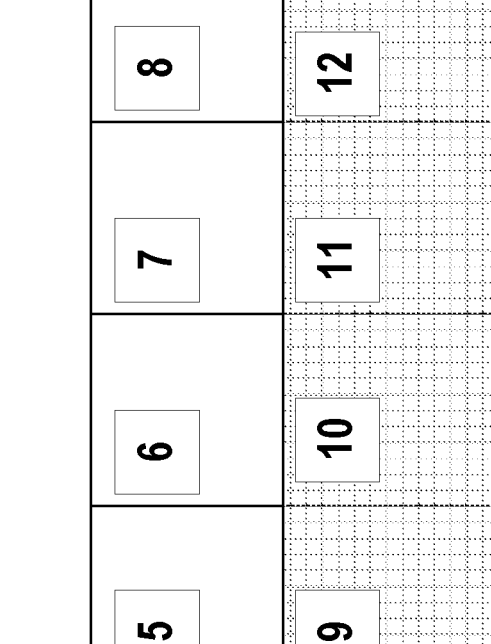

For example, as depicted in FIGS. 3A and 3B, each frame of the primary stream can be divided into multiple subportions e.g., divided into tiles 1, 2, 3, and 4 in FIG. 3A, or into subportions 5, 6, 7, 8, 9, 10, 11, and 12 in FIG. 3B. Each subportion is decodable independent of each other subportion, where the system 110 (e.g., local area server 202a) can replace one or more of the subportions with a tiled subportion of the secondary stream during a compressed-domain compositing process to generate the composite video.

Figure 4:
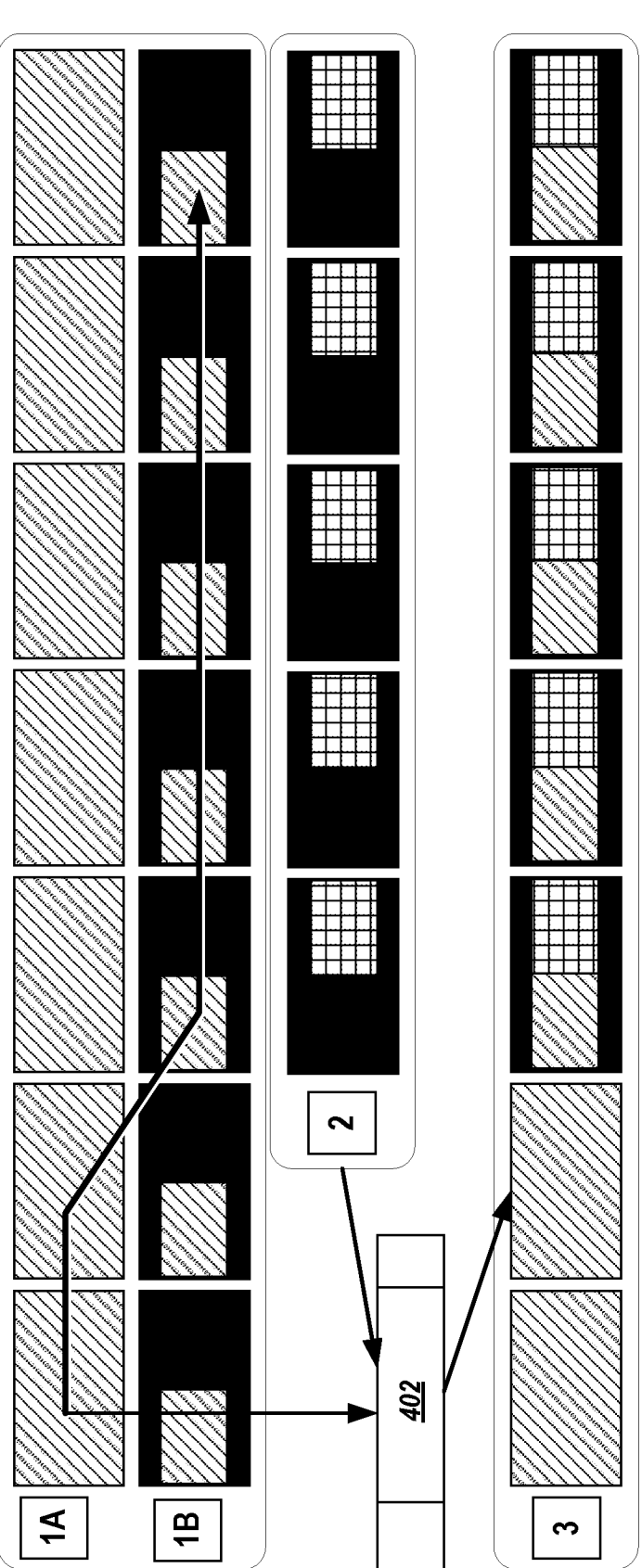
FIG. 4 is a schematic of an example compressed-domain compositing process.

As described further with reference to FIG. 4, the pre-conditioning of each video stream includes rendering each frame of the conditioned video stream to include a video content region and a "null" or black region where the null or black portions of the pre-processed video stream can be replaced with a video content region of another video stream.

In such cases, the primary stream and secondary stream are each encoded such that tiles are pulled from each stream and combined to form the composite frame. For example, each video stream is encoded as half-width content of a first portion the frame and pre-conditioned as described herein, and the other, second portion of the frame is compressed-domain (CD) composited in the encoder to produce a full width content. In other words, the pre-conditioning includes only encoding the tiles that include content (e.g., non-null tiles). In another example, as depicted in FIG. 3A, during the pre-conditioning, the frames of a video stream that will be included as primary content stream in a composite video stream can be rendered such that the video content region is within tiles 3 and 4, and the frames of a video stream that will be included as secondary content stream in the composite video stream can be rendered such that the video content region of the secondary content stream is within tiles 1 and 2.

In some implementations, instead of (or in addition to) a "null" or black region, the pre-conditioning can include rendering a border encompassing the video content region. For example, a border can be an artistic feature (e.g., a texture, pattern, graphic, etc.).

In some implementations, the primary content stream can be pre-processed and stored at the digital component database to condition the content stream such that it can be included at a later point in time in a composite stream for presentation at the user device. The condition includes, rendering, for each frame of the primary content stream, a new frame where the original content occupies 50% or less of the frame (e.g., 50% or less of the frame including edge regions that are shared with replaced content), and the rest of the frame is rendered as "null" or black content. In other words, the original content can be rendered within a video content region of the new frames forming the pre-processed primary content stream. The video content region of the primary content streams can be selected to be the same orientation with respect to the frame, e.g., a first (left-hand side) portion of the frame. The secondary stream (e.g., livestream content) can be pre-processed to render the content of each frame of the secondary stream as 50% or less of a new frame, where the rest of the new frame is rendered as "null" or black content. The original content can be rendered within a video content region of the new frames forming the pre-processed secondary content stream. The video content region of the secondary content streams can be selected to be a same orientation with respect to the frame, e.g., a second (right-hand side) portion of the frame.

In some implementations, the local area server (e.g., local area server 202a) can switch between providing the encoded PiP composite stream to the user device, a livestream (e.g., only the secondary stream), and the third-party content (e.g., only the primary stream).

FIG. 4 is a schematic of an example compressed-domain compositing process. A local area server 402 (e.g., local area server 202a) publishes video streams (1A) (e.g., livestream content), 1B (e.g., livestream content pre-conditioned for inclusion in a composite stream), and (2) (e.g., content pre-conditioned for inclusion in the composite stream). The local area server 402 can select whether (i) to provide the video stream (1A), which includes only the livestream video content or (ii) to provide a composite video stream including video streams (1B) and (2). For example, the local area server 402 can select, based in part on a request from the user device including user device information, whether to provide the video stream (1A) or the video stream (1B) to the user device.

In instances where only the livestream (1A) is provided to the user, the stream can be encoded per standard (e.g., as if there was no PiP stream) processes. In other words, without the additional pre-conditioning steps used to prepare the video stream for inclusion in a composite video stream. The livestream (1A) is provided to the user device as a single video stream (3), which is decodable by a single decoder of the user device.

In instances where the livestream is provided in the composite video stream to the user device, the stream is conditioned (1B) for substitution as the PiP with pre-conditioned video stream (2). The local area server 402 generates and provides the composite video stream as the single video stream (3) from the (1B) and (2) video streams which is decodable by the single decoder of the user device. Due to the pre-conditioning described herein, the local area server 402 is able to provide a unique, per-user device composite video stream.

Figures 5A, 5B:
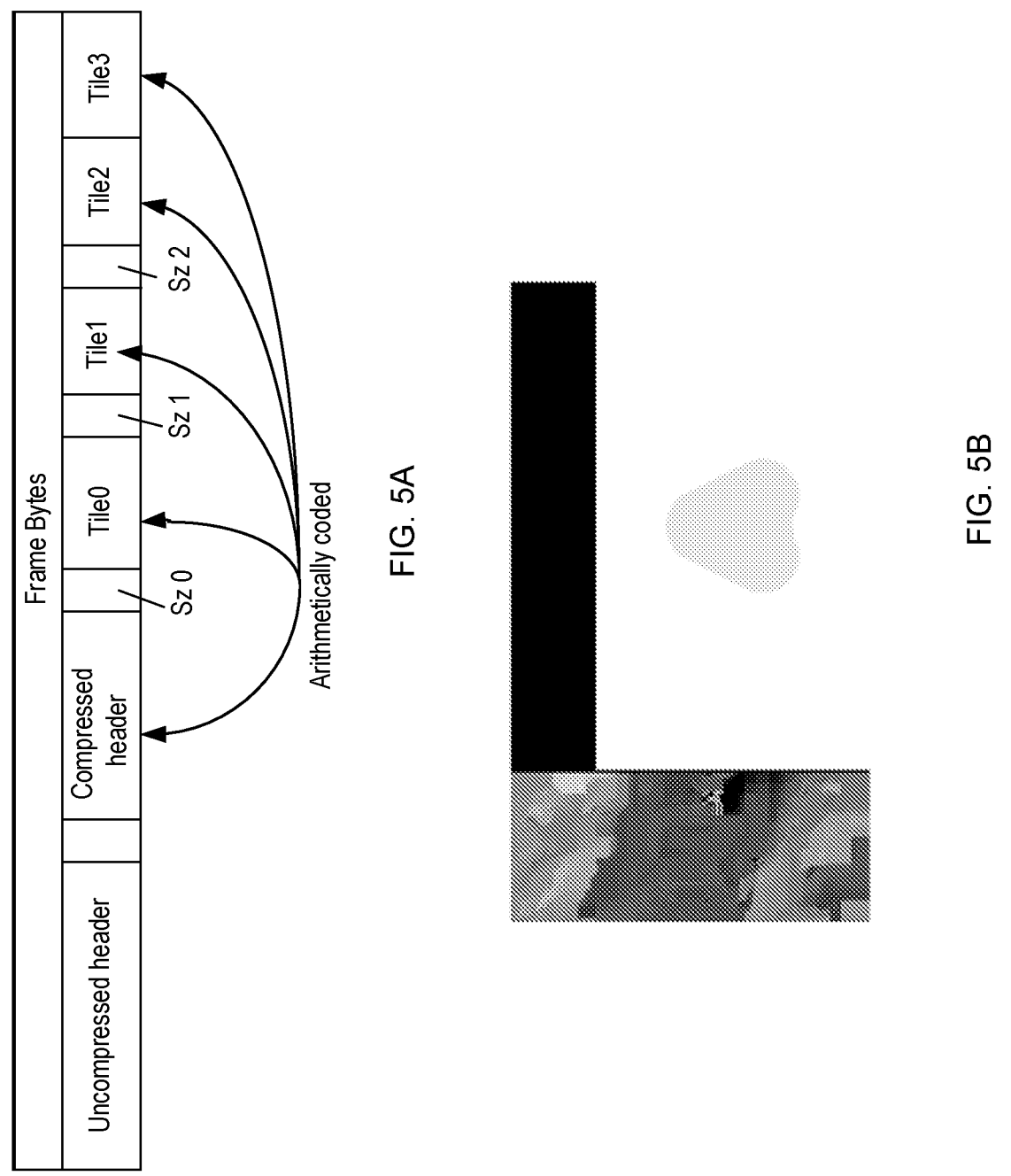
FIG. 5A is a schematic of an example of a VP9-based frame structure.
FIG. 5B illustrates an example of a corrupt video stream.

As introduced above, the video content streams are pre-conditioned for inclusion in a composite video stream. FIG. 5A is a schematic of an example of a VP9-based frame structure, which will serve as a high-level overview for the discussion below. Within the VP9 framework, each subportion (e.g., "tile") of the frame is separately arithmetically encoded.

The frame structure, e.g., as depicted schematically in FIG. 5A, includes an uncompressed header which includes information on how to decode the full frame (e.g., in the examples of VP9 and AV1), such that in the instance that the frame is a composite frame including content from two or more different video streams, the uncompressed header includes the information for decoding all the video streams forming the composite. For example, an uncompressed header for a frame of a composite stream including a primary stream and a secondary stream includes the information for decoding the primary stream portion and the secondary stream portion within the composite stream. As such, the information within the uncompressed headers of the pre-conditioned video streams (prior to the compressed-domain compositing) are structured similarly, e.g., at least some aspects of the uncompressed headers are matching across all the pre-conditioned streams. Otherwise, as depicted in FIG. 5B, structural dissimilarities may result in corrupt video files.

Thus, the pre-conditioning of the video streams, e.g., using VP9 or AV1, generally includes aligning the arithmetic coding of the compositing video streams to reduce likelihood of corruption in the produced composite stream. One modification to the encoding process for a video stream for inclusion in a composite video stream is to align the arithmetic coding used to express the symbol frequencies for the symbols used to describe how to reconstruct the output at the decoder. In arithmetic decoding, the probabilities are specified at the frame level, normally symbol frequencies in one frame updates the probabilities in the next frame. As such, the subsequent frame can be transmitted using fewer bits.

When pre-conditioning video streams for inclusion in a composite video, a portion of each frame of the pre-conditioned video is rendered as "null" or black. As a result, when encoding the pre-conditioned video streams, a portion (e.g., half) of the frame is going to be encoded as "null" or black. In the cases of using standard encoding practices, the resulting composite video stream (which replaces the null or black tiles with the substitute PiP video stream), would result in the decoder seeing different symbol frequencies for current frame resulting in it using incorrect probabilities when decoding the next frame of the composite video stream. In other words, since the symbols describing the frame of each video stream forming the composite video stream are individually compressed using arithmetic coding to facilitate transmitting fewer bits to the end device, the symbol frequencies used to update probabilities between sequential frames of the video stream should be in agreement, e.g., a complete match, at the time of encoding of the streams to ensure agreement between the compositing video streams (e.g., between the primary stream and the secondary stream forming the composite video stream) so that the composite video decodes properly. This can be enforced using, for example, error resilient encoding or by explicitly signaling the probabilities.

In some implementations, ensuring agreement during the decoding of the composite video stream includes using a static (e.g., default) set of known values in the standard for encoding the frames of the pre-conditioned video streams. For example, within the VP9 codec, the default over_under-.webmprobabilities functionality can be used when encoding each frame in the error resilient mode. By engaging with this feature (generally used for lossy 'error prone' communication links) in a novel manner, the use of the default probabilities for each frame (rather than updating) can ensure that the symbol probabilities will agree when the composite video stream including two or more different video streams is decoded.

In some implementations, for example, where reducing bandwidth at the end user device justifies an increase on a processing load on the local area server, ensuring agreement during the decoding of the composite video stream includes combining (e.g., concatenating) the probabilities of the symbol frequencies for each composited frame to include the respective probabilities of the symbol frequencies of each of the video streams included in the composite video stream. For example, ensuring agreement during decoding can include undoing the arithmetic encoding of the two video streams and then re-arithmetically encoding the two videos together (i.e., updating probabilities from frame to frame). Although this approach can require significantly more processing on the local area server, it can still be significantly cheaper than using traditional methods that would require the full encoding of the video stream.

Another modification to the encoding of video streams for inclusion in a composite video stream is to leverage the functionality of a segmentation map of the frame defined in the codec to ensure agreement between various qualities and compression levels of the encoded video streams included in the encoded composite video stream. The functionality of the segmentation map, e.g., using segment identifiers (IDs), can be implemented to enable each of the video streams included in the composite video stream to utilize an independent encoding quality/compression level that is appropriate for the complexity of the content included in the video stream. In such cases, the decoding process then functions to present the decoded composite video having the properties of each of the composing video streams. The segmentation map, e.g., within the VP9 framework, can be applied to the frame to divide the frame into 8×8 pixel block regions corresponding to different included video streams and where different segment identifiers (IDs) can be assigned to the pixel block regions, with the uncompressed header incorporating, for each segment ID used, values for one or more properties adjusting the decoding of that region in the composite video. In other words, the different segment IDs can be used to force the uncompressed header into allowing values for one or more properties of the decoding of the composite video into agreement. For example, the properties of the segmentation map can be used to ensure agreement of one or more of quantization level (Q), loop filter strength, reference frames, and skip modes between the source video streams and the composite video stream.

Figure 6:
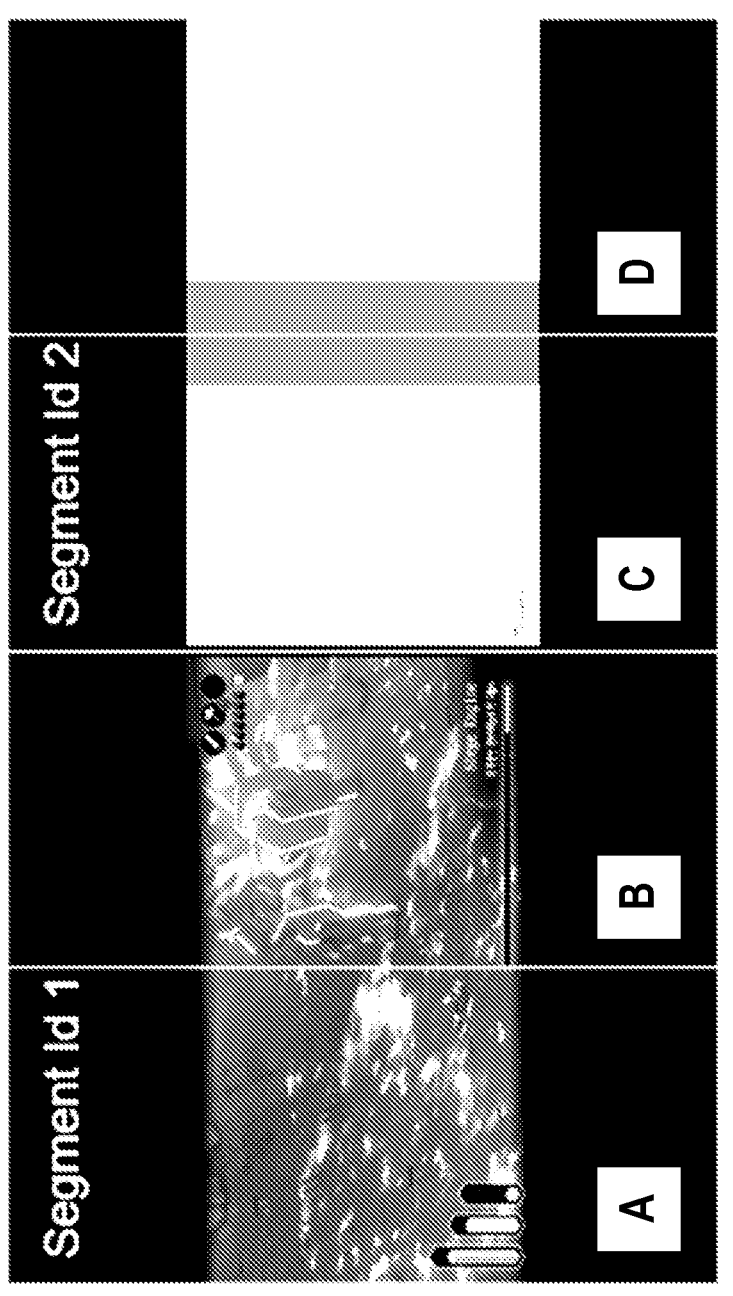
FIG. 6 depicts an example of a composite video frame including multiple tiles.

FIG. 6 depicts an example of a composite video frame including multiple tiles. As depicted, frame 600 is divided into four tiles A, B, C, and D. Tiles A and B include the video content region of a first video stream (e.g., secondary stream) and tiles C and D include the video content region of a second video stream (e.g., primary stream). The first video stream included in tiles A and B uses a first segment ID for all the pixels within the tiles A and B during the encoding of the first video, and the second video uses a second segment ID for all the pixels within the tiles C and D during the encoding of the second video.

In some implementations, separate segment IDs for the different tiles of the frame can be used to ensure agreement of a quantization level (Q) between each of the video streams included in the composite video stream. In other words, each composed video in the composite video stream can be assigned an independent quantization level. Generally, encoding utilizes a number of constraints around bitrate and quality to reduce a number of transmitted bits for a network or device or reduce a number of transmitted bits that do not noticeably improve quality. For example, high complexity content will result in lower quality (higher quantization level), and simpler content will (e.g., to a point), result in higher quality (lower quantization level). Using a single quantization level for all content can result in either too many bits for complex content or degraded quality for simpler content.

Briefly, discrete cosine transform (DCT) can be implemented by the server to identify important or salient aspects of within the structure of the image captured by the frame, to which the quantization factor can be applied to generate a lossy compression of the frame. The data of the DCT output can be quantized, where a lower quantization level results in higher quality (higher fidelity to the original image) and a higher quantization level results in lower quality (lower fidelity to the original image).

In some implementations, adjusting a quantization level can be used to ensure a rate control where the encoding (e.g., compression) of the video content is within a target range of bits such that changes in quality between the different video content streams is less noticeable to a viewing user. The encoder can apply a separate Q to the discrete cosine transform (DCT) of the tiles of the frame including the video content regions of the video stream from DCT of the tiles including the "null" or black area of the frame. For example, a lower quantization level can be used for tiles including the video content region and a higher quantization level can be used for tiles including the null or black regions.

Typically, Q can be selected to be constant across the frame. However, to ensure agreement of Q across a composite video stream frame, the encoder can leverage the segmentation map of the frame and use separate segment IDs for each of the tiles of the frame during the encoding process. This forces the uncompressed header of the frames of the composite video stream into allowing separate Qs for different regions identified by the segment IDs. For example, when the local area server performs the compressed-domain compositing of the different video streams to generate the composite video stream by replacing one or more tiles in the primary stream with tiles of the secondary stream, the separate segment IDs for each of the retained tiles of the primary stream and the inserted tiles of the secondary stream ensure that the Q of each of the tiles of the composite stream is consistent with the original values.

In some implementations, segment IDs can be used to enhance pixel resolution in regions of interest (e.g., saliency) with a first segment ID having a first Q for base content (e.g., high Q) and a second segment ID having a second Q for small regions to fix up any issues of quality (e.g., low Q). In some instances, segment IDs can be used to boost blocks of pixels that have high visibility to the user (e.g., an object or region in the video content that appears throughout many frames of the playback).

In some implementations, separate segment IDs can be used for each composed video in the composite video stream. For example, two segment IDs can be used for each composed video, where the first segment ID is used for most of the content from the composed video and uses the same Q value as the source video, and where the second segment ID has the smallest Q possible and is used when a motion vector block needs to be decomposed into smaller blocks (e.g., in the case of hard motion vector fix-up described in FIG. 10B). In this case, the residual for the block that is used to correct for any difference between the copied content and the desired content often needs to be re-encoded for the smaller block. In instances in which the original Q value is used, large errors can be introduced such that using the smaller Q value minimizes these errors.

Figure 7:
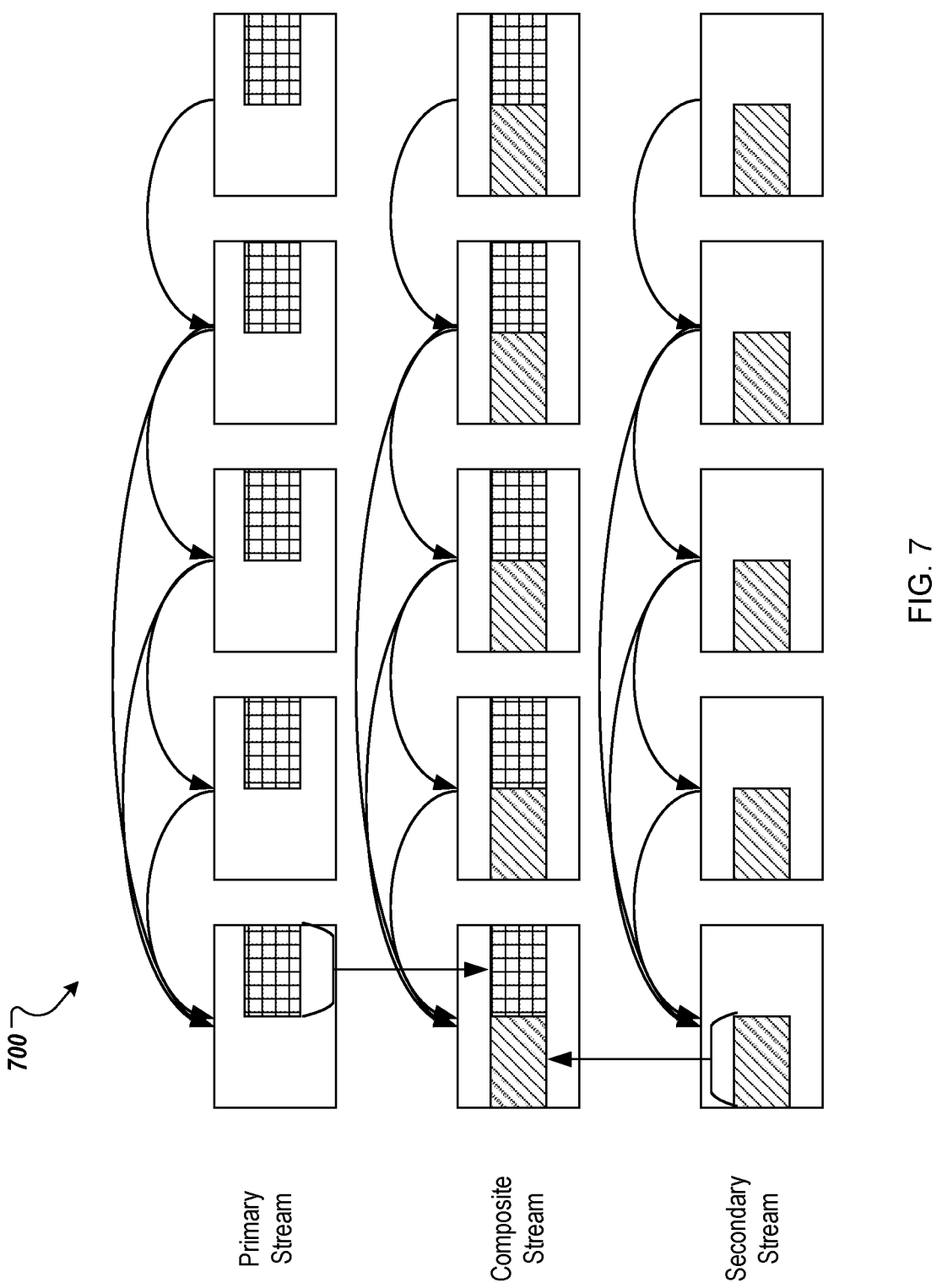
FIG. 7 depicts a schematic of an example of reference frames between a primary stream, secondary stream, and a composite video stream thereof.

FIG. 7 depicts a schematic of an example 700 of reference frames between a primary stream, secondary stream, and a composite video stream thereof. Within the scope of the VP9 codec, motion vectors within a frame can reference up to three different frames from a set of 8 reference buffers. During the decoding of the composite video stream, the reference frames used in each of the primary and secondary video streams must agree such that the reference frames used in the composite video frame are the same as those of the primary and secondary streams.

In some implementations, one or more post-processing steps are implemented at the user device after the frame has been decoded and reconstructed for presentation. One such post-processing step includes a loop/deblocking filter which can be applied by the user device to the reconstructed frame to smooth edge artifacts across adjacent pixel blocks. Edge artifacts between adjacent pixel blocks may arise due to the DCT encoding for each block that is performed independently.

Figure 8:
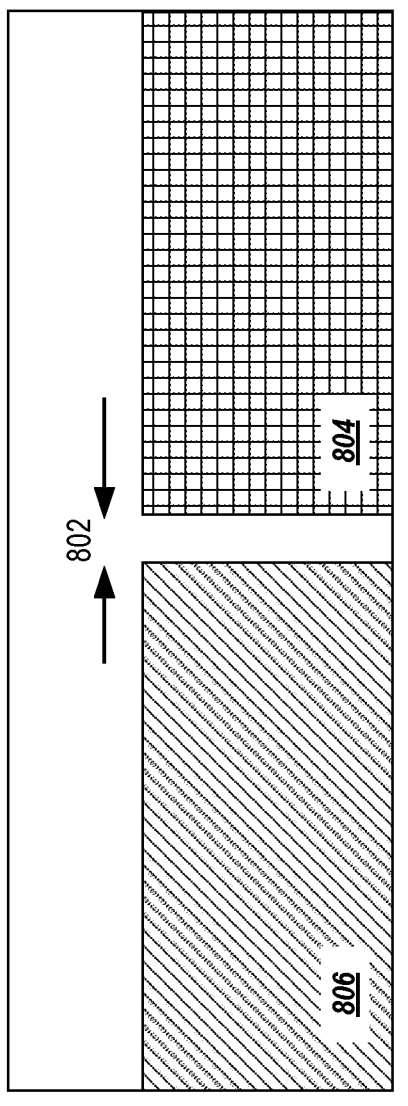
FIG. 8 depicts a schematic of an example of a gap inserted between two video streams of a composite video stream.

In some implementations, to prevent the loop filter from smoothing between the two different streams composing the composite stream, a gap is included between the video streams included in the composite stream. FIG. 8 depicts a schematic of an example of a gap inserted between two video streams of a composite video stream. The gap 802 located in between a primary stream 804 and secondary stream 806 is at least a threshold number of pixels wide to prevent smoothly/blending, for example, at least 16 pixels separation from an edge of the video content region of the primary stream to an edge of the video content region of the secondary stream. At times, a respective portion of the gap 802 between a primary stream 804 and secondary stream 806 is inserted into each of the primary stream 804 and secondary stream 806 during the pre-conditioning of each of the primary stream 804 and secondary stream 806, e.g., 8 pixels are each added to an edge of the video content region of the video stream that will be adjacent to another video content region of another video stream when the two video streams are included in a composite video stream.

In general, a substantial fraction of the compression of video content during the encoding process is a result of the use of motion vectors to track actual changes between sequential frames, where a residual (e.g., represented by a DCT) is used to encode a difference between the actual frame and the predicted frame. Motion vectors can be represented by differing numbers of bits and can have high precision or low precision but must agree across the frame to ensure that the reconstructed composite video stream reflects the content of the original primary and secondary streams. In some implementations, the motion vector precision can be set to a default value during the encoding process of the video streams to be included in the composite video stream, e.g., set the value to 1.

In some implementations, due to the limitations of the hardware encoder (e.g., not having keep-out regions), the server may, during the encoding process, pull content from outside the frame of a video stream into the frame. As a result, during the decoding process of a composite video stream by the user device, the decoder may use the reference from outside the frame which, after compositing, may be occupied by the video content region of a different video stream of the composite video stream. The vectors which reference regions during the encoding that can create decoding issues can be updated, as described with reference to FIGS. 9A, 9B, 9C and FIGS. 10A, 10B.

Figure 9A:
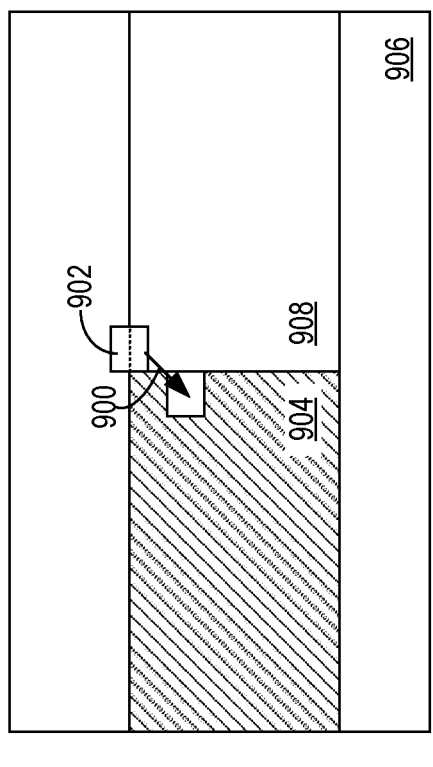
FIGS. 9A-9C depict an example of a motion vector containment solution.
Figure 9B:
Figure 9C:
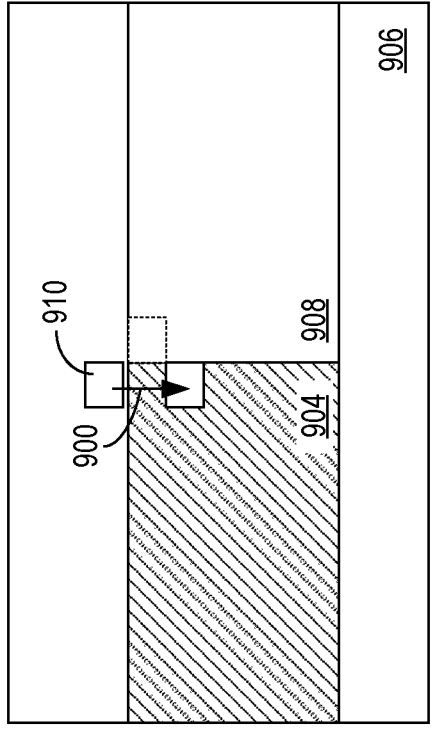

FIGS. 9A-9C depict an example of a motion vector containment solution. As depicted in FIG. 9A, the motion vector 900 references a "null" or black region 902 from outside the video content region 904 of the frame 906. The referenced region 902 is located within an area that will be occupied by another video content region 908 when the composite video stream frame is generated, e.g., as depicted in FIG. 9B. As depicted in FIG. 9C, the motion vector 900 is moved to an alternative "safe" region 910 of "null" or black content that are above and below the first video content region 904. In some implementations, all the vectors moved from black content that are moved to a "safe" region can copy content from the same source in the previous frame (i.e., can reference the same safe block).

Figure 10B:
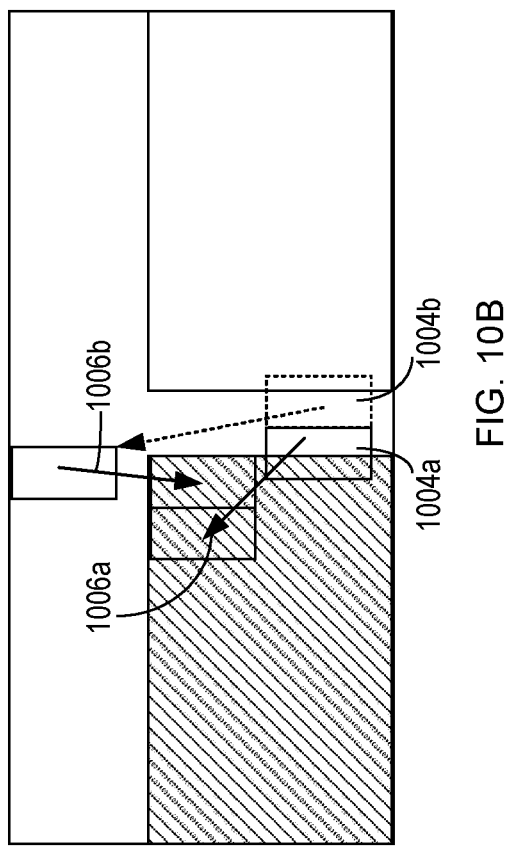
FIGS. 10A-10B depict another example of a motion vector containment solution.
Figure 10A:
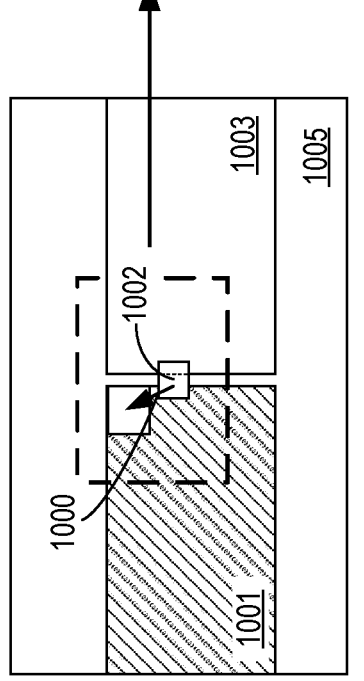

FIGS. 10A-10B depict another example of a motion vector containment solution. As depicted in FIG. 10A, the motion vector 1000 references a region 1002 that will be located between the two video content regions 1001, 1003 of the composite video stream 1005. As depicted in FIG. 10B, the referenced region 1002 is divided into subblocks 1004a and 1004b, e.g., using partitioning. Subblock 1004a only includes kept content (of the video content region in question) or the black content between the two video content regions. Subblock 1004b includes the area that will be occupied by another video content region (and possibly also black content) and is moved to a "safe" region, as described with reference to FIGS. 9A-9C. Separate motion vectors

1006a, 1006b are generated for each of the subblocks 1004a, 1004b, and updated residuals are generated for each of the subblocks 1004a, 1004b. Generating updated residuals includes decoding (e.g., using a reverse DCT) and reencoding (e.g., re-doing the DCT) as the size of the subblocks 1004a, 1004b, where the recoded values are substantially the same to the original residual for the region 1002. For example, if the original region is 32×32 pixels, each subblock can have a size of 4 16×16 pixels.

In some implementations, to ensure at least a threshold match between the original residual value and the re-encoded residual values for the subblocks, separate segment IDs can be used for the subblocks to set the Q to a very low value (as compared to the rest of the tile), which results in higher resolution, higher quality, and higher fidelity to the originally encoded content. In other words, blocks with problematic motion vectors can be replaced with 'intra coded' blocks (and including a low Q value segment-id).

In some implementations, for efficiency, the server can only encode the half of the frame that includes the video content region (e.g., that includes the content from the video stream) and pad (e.g., fill in) the rest of the frame with black to produce a full frame. In many instances, motion vectors are encoded relative to a pre-existing motion vector from the current or a previous frame. Implementing this process can result in a motion vector being encoded relative to another reference motion vector that (for the new block) extends off the edge of the frame. If the reference motion vector extends too far from the edge of the image (e.g., >32 pixels), it is clipped and the clipped version is used as the base for the new motion vector to encode the delta of the motion vector from the reference motion vector (if any). However, when the reduced width frame is extended to full width with Compressed Domain compositing, it is possible for some of these previously clipped reference motion vectors to become declipped (since they no longer extend past the edge of the frame), which can cause the motion vector that depended on them to shift. To resolve this issue, the server can implement a declipping process on the motion vectors of the frame during the pre-conditioning process, where any declipped reference motion vectors are identified, and the dependent motion vector's delta is updated based on the new declipped reference motion vector.

FIG. 11 is a flowchart of an example process 1100 for compressed-domain composite video streaming. For convenience, the process 1100 will be described as being performed by a system of one or more computers, located in one or more locations, and programmed appropriately in accordance with this specification. For example, a digital component distribution system, e.g., the digital component distribution system 110 of FIG. 1 (e.g., including the server 200 and local area servers 202 of FIG. 2), appropriately programmed, can perform the process 1100.

The system, e.g., local area server 202, obtains 1102 compressed video streams, each compressed video stream including a plurality of frames. Each frame of the compressed video includes a video content region that occupies any number of contiguous tiles/slices. Each frame is encoded with a first segment identifier for pixels included in the video content region and a second segment identifier for pixels not included in the video content region. The frames of the compressed video are encoded using a set of static symbol probabilities.

In some implementations, the compressed video streams are encoded by a server, e.g., 200, in data communication with local area server 202. The compressed video streams can be generated from video streams obtained, for example, from third-party content generators. Generating a compressed video stream can include rendering, by the server, a new frame for each of the frames of a video stream, where the new frame includes a video content region that is any number of contiguous tiles in the frame and corresponds to the content of the original frame. The video content region can include one or more tiles of a tile-based composite of the frame, e.g., as depicted in FIG. 3A.

The new frame can further include a black or "null" region outside the video content region. The frame can then be encoded (e.g., using the VP9 codec) where the probabilities of the symbol frequencies are set using a default value. In other words, the probabilities are not updated between frames (e.g., using error-resilient mode in the VP9 framework).

In some implementations, generating the compressed video further includes generating a segmentation map for the frame and defining a first segment identifier for pixels included in the video content region of the new frame and a second segment identifier for pixels not included in the video content region (i.e., the black or "null" region).

In some implementations, the system can assign one or more parameter values to each of the segment identifiers, e.g., quantization level (Q), reference frames, loop filter value, motion vector values, etc. For example, a first segment identifier can be assigned a first Q and a second segment identifier can be assigned a second, different Q.

In some implementations, generating the compressed video further includes rendering a gap (e.g., as described in FIG. 8) along an edge of the video content region and within the video content region of the compressed video stream. The gap can have a width of at least 8 pixels, where the null region of the video content region for a compressed video will be adjacent to another video content region of another compressed video when the compressed videos are included into a composite video stream. An edge along which the null region is encoded during the encoding process can depend in part on whether the compressed video will be included into the composite video stream as a primary stream or a secondary stream. For example, the null region will be included on the right side of the video content region of a secondary stream (e.g., 806) and a left side of the video content region of a primary stream (e.g., 804).

In some implementations, generating the compressed video streams includes generating primary video streams, e.g., pre-conditioned and stored video content, and generating at least one secondary video stream, e.g., livestream content. For example, multiple video content streams can be pre-conditioned and stored in preparation for inclusion in a composite video stream including the livestream content, where different users can receive a different composition of primary video streams with the same livestream video.

In some implementations, the local area server 202 obtains a second set of compressed video streams where the frames of the second set of compressed video streams include the video stream rendered to more than 50% of the frame, e.g., all or nearly all of the frame. In other words, the local area server 202 can receive encoded published livestream video content from server 200 which can be provided to the user device in response to a request for non-composite video stream content.

The system, e.g., local area server 202, receives 1104 requests for video stream content from a user device. The request, e.g., request 108, can include a request for a livestream video content (e.g., secondary stream) and user information which can be used to select a primary stream to include in the composite video stream with the secondary stream for presentation on the user device. The local area server 202 can receive multiple requests from the different user devices and generate, using compressed-domain compositing, respective unique composite video streams for presentation on each of the requesting user devices based in part on the user information.

In some implementations, the local area server 202 can pre-cache a set of primary streams at the local area server 202 in anticipation of generating the composite video stream (s) with one or more secondary streams (e.g., livestreams).

The system generates 1106, by the local area server and in response to the request from the user device, the compressed-domain composite video stream from a first compressed stream and a second compressed stream of the plurality of compressed video streams. Each frame of the compressed-domain composite video stream includes a first video content region of the first compressed stream and a second video content region of the second compressed stream, where the first video content region and the second video content region occupy non-overlapping regions of the frame corresponding to complete tiles/slices in the encoded video.

In some implementations, the system generates the composite video stream by replacing one or more tiles of the primary stream with one or more tiles of the secondary stream. For example, replacing the null tiles of the primary stream with the video content region tiles of the secondary stream. The system further generates an updated uncompressed header from the uncompressed header information for each of the compositing videos. For example, the system incorporates the segment identifiers of the video content region of the primary stream and the segment identifiers of the video content region of the secondary stream into the uncompressed header of the composite video stream using tile replacement and while in the compressed-domain.

The system provides 1108, to the user device, a packet including a set of frames of the compressed-domain composite video stream decodable by a single decoder.

In some implementations, a user request for video content (e.g., for livestream content) includes a request for a non-composite video stream. In other words, a user request can be to view only the secondary stream. In such cases, the local area server can provide a packet including a set of frames of a third video stream including only the livestream content decodable by a single decoder.

FIG. 12 is a block diagram of an example computer system 1200 that can be used to perform operations described above. The system 1200 includes a processor 1210, a memory 1220, a storage device 1230, and an input/output device 1240. Each of the components 1210, 1220, 1230, and 1240 can be interconnected, for example, using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 can include, for example, a hard disk device, an optical disk device, a solid-state drive, a storage device that is shared over a network by multiple computing devices (e.g., a cloud storage device), or some other large capacity storage device.

The input/output device 1240 provides input/output operations for the system 1200. In one implementation, the input/output device 1240 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 1260. Other implementations, however, can also be used, such as mobile computing devices, mobile communication devices, set-top box television client devices, etc.

Although an example processing system has been described in FIG. 12, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively, or in addition, the carrier can be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random-access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid-state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on its software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

The subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship with each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
obtaining, by a local area server, a plurality of compressed video streams, each compressed video stream comprising a plurality of frames, each frame comprising a video content region comprising a portion of the frame, each frame encoded using a segment identifier for pixels included in the video content region, and the plurality of frames encoded using a set of static symbol frequencies;
receiving, by the local area server and from a user device, a request for video stream content;
compositing, by the local area server and in response to the request from the user device, a first compressed video stream and a second compressed video stream of the plurality of compressed video streams to obtain a compressed-domain composite video stream,
wherein each frame of the compressed-domain composite video stream comprises a first video content region of the first compressed video stream and a second video content region of the second compressed video stream,
wherein each frame includes a respective first segment identifier specifying a first quantization level for pixels corresponding to the first video content region and a second segment identifier specifying a second quantization level for pixels corresponding to the second video content region;
wherein the first video content region and the second video content region occupy non-overlapping portions of the frame; and
providing, to the user device, a packet including a set of frames of the compressed-domain composite video stream decodable by a single decoder.

2. A computer-implemented method, comprising:
obtaining, by a local area server, a plurality of compressed video streams, each compressed video stream comprising a plurality of frames, each frame comprising a video content region comprising a portion of the frame, each frame encoded using a segment identifier for pixels included in the video content region, and the plurality of frames encoded using a set of static symbol frequencies;
receiving, by the local area server and from a user device, a request for video stream content;
compositing, by the local area server and in response to the request from the user device, a first compressed video stream and a second compressed video stream of the plurality of compressed video stream to obtain a compressed-domain composite video stream,
wherein each frame of the compressed-domain composite video stream comprises a first video content region of the first compressed video stream and a second video content region of the second compressed video stream, wherein each includes a respective first segment identifier for pixels corresponding to the first video content region and a second segment identifier for pixels corresponding to the second video content region;

wherein the first video content region and the second video content region occupy non-overlapping portions of the frame; and providing, to the user device, a packet including a set of frames of the compressed-domain composite video stream decodable by a single decoder, wherein obtaining the plurality of compressed video streams comprises:

receiving, by a server, a plurality of video streams; and generating the plurality of compressed video streams comprising, for each compressed video stream:

rendering, for each frame of the plurality of frames of the video stream, a new frame including a video content region comprising the portion of the frame and corresponding to content of the frame;

defining, for the video content region, the segment identifier for pixels included in the video content region; and encoding the frame using a set of static symbol frequencies.

3. The method of claim 2, wherein the rendering further comprises rendering a region not included in the video content region as null content.

4. The method of claim 2, wherein generating of the plurality of compressed video streams comprises:

generating primary video streams comprising context-responsive video content; and generating at least one secondary video stream comprising livestream content, wherein the first compressed video stream comprises a primary video stream and the second compressed video stream comprises a secondary video stream.

5. The method of claim 4, wherein the generating of the primary video streams comprises pre-conditioning and storing context-responsive videos in a database for inclusion in the compressed-domain composite video stream, wherein a proper subset of the context-responsive video content is pre-cached at the local area server.

6. The method of claim 5, wherein generating the compressed-domain composite video stream comprises:

selecting, by the local area server and in response to a user-based selection criteria for the user device, a primary content video from the database of primary video stream for inclusion in the compressed-domain composite video stream, wherein, in response to a different user request, the local area server selects a different primary content video for inclusion in the compressed-domain composite video stream.

7. The method of claim 2, wherein generating of the plurality of compressed video streams comprises:

generating video streams comprising at least one of context-responsive video content and livestream content, wherein the first compressed video stream and the second compressed video stream are generated from the video streams.

8. The method of claim 2, wherein encoding the frame using a set of static symbol frequencies comprises:

encoding, for each symbol probability in the frame with a default frequency value.

9. The method of claim 2, wherein the defining, for the video content region, the segment identifier further comprises:

assigning, to the segment identifier for pixels included in the video content region, a first quantization level.

10. The method of claim 2, wherein rendering further comprises:

rendering, along an edge of the video content region and within the video content region of the compressed video stream, a null region comprising a width, the null region of the video content region being located next to a replacement region configured to be replaced by another compressed video stream in a composite video stream.

11. The method of claim 1, wherein generating the compressed-domain composite video stream from a first compressed stream and a second compressed stream comprises:

constructing an uncompressed header of each frame of the compressed-domain composite video stream based on the segment identifiers for each of the first compressed stream and the second compressed stream.

12. The method of claim 1, wherein the frame comprises tiles and wherein the video content region comprises one or more contiguous tiles of a tile-based composite of the frame, and wherein the pixels included in the video content region comprise the one or more contiguous tiles.

13. The method of claim 12, wherein the one or more contiguous tiles comprising the video content region comprises half of the tiles of the tile-based composite of the frame.

14. The method of claim 1, further comprising:

obtaining, by the local area server, a second plurality of compressed video streams, each of the second plurality of compressed video stream comprising a plurality of frames;

receiving, by the local area server and from the user device, a second request for video stream content; and in response to the second request, providing, by the local area server and to the user device, a second packet including a set of frames for one of the second plurality of compressed video streams.

15. One or more non-transitory computer storage media encoded with computer program instructions that when executed by one or more computers cause the one or more computers to perform operations comprising:

obtaining, by a local area server, a plurality of compressed video streams, each compressed video stream comprising a plurality of frames, each frame comprising a video content region comprising a portion of the frame, each frame encoded using a segment identifier for pixels included in the video content region, and the plurality of frames encoded using a set of static symbol frequencies;

receiving, by the local area server and from a user device, a request for video stream content;

compositing, by the local area server and in response to the request from the user device, a first compressed video stream and a second compressed video stream of the plurality of compressed video streams to obtain a compressed-domain composite video stream, comprising, for each frame of a plurality of frames of the compressed-domain composite video stream:

compositing, into non-overlapping portions of the frame, a corresponding first video content region of a frame of the first compressed video stream with a corresponding second video content region of a frame of the second compressed video stream;

assigning, a respective first segment identifier specifying a first quantization level for pixels corresponding to the first video content region and a second segment identifier specifying a second quantization level for pixels corresponding to the second video content region; and obtaining the plurality of frames of the compressed-domain composite video stream; and providing, to the user device, a packet including a set of frames of the plurality of frames of the compressed-domain composite video stream decodable by a single decoder using the set of static symbol frequencies.

16. The computer storage media of claim 15, wherein obtaining the plurality of compressed video streams comprises:

receiving, by a server, a plurality of video streams; and generating the plurality of compressed video streams comprising, for each compressed video stream:

rendering, for each frame of the plurality of frames of the video stream, a new frame including a video content region comprising the portion of the frame and corresponding to content of the frame;

defining, for the video content region, the segment identifier for pixels included in the video content region; and encoding the frame using a set of static symbol frequencies.

17. The computer storage media of claim 16, wherein generating of the plurality of compressed video streams comprises:

generating primary video streams comprising context-responsive video content; and generating at least one secondary video stream comprising livestream content, wherein the first compressed video stream comprises a primary video stream and the second compressed video stream comprises a secondary video stream.

18. The computer storage media of claim 17, wherein the generating of the primary video streams comprises pre-conditioning and storing context-responsive videos in a database for inclusion in the compressed-domain composite video stream, wherein a proper subset of the context-responsive video content is pre-cached at the local area server.

19. The computer storage media of claim 18, wherein generating the compressed-domain composite video stream comprises:

selecting, by the local area server and in response to a user-based selection criteria for the user device, a primary content video from the database of primary video stream for inclusion in the compressed-domain composite video stream, wherein, in response to a different user request, the local area server selects a different primary content video for inclusion in the compressed-domain composite video stream.

20. A system comprising:

one or more computers and one or more storage devices on which are stored instructions that are operable, when executed by the one or more computers, to cause the one or more computers to perform operations comprising:

obtaining, by a local area server, a plurality of compressed video streams, each compressed video stream comprising a plurality of frames, each frame comprising a video content region comprising a portion of the frame, each frame encoded using a segment identifier for pixels included in the video content region, and the plurality of frames encoded using a set of static symbol frequencies;

receiving, by the local area server and from a user device, a request for video stream content;

compositing, by the local area server and in response to the request from the user device, a first compressed video stream and a second compressed video stream of the plurality of compressed video streams to obtain a compressed-domain composite video stream, comprising, for each frame of a plurality of frames of the compressed-domain composite video stream:

compositing, into non-overlapping portions of the frame, a corresponding first video content region of a frame of the first compressed video stream with a corresponding second video content region of a frame of the second compressed video stream;

assigning, a respective first segment identifier specifying a first quantization level for pixels corresponding to the first video content region and a second segment identifier specifying a second quantization level for pixels corresponding to the second video content region; and obtaining the plurality of frames of the compressed-domain composite video stream; and providing, to the user device by the local area server, a packet including a set of frames of the plurality of frames of the compressed-domain composite video stream decodable by a single decoder using the set of static symbol frequencies.

* * * * *